(12) United States Patent (10) Patent No.: US 7,639,256 B1
Yablonski et al. (45) Date of Patent: Dec. 29, 2009

(54) SYSTEM AND METHOD FOR DISPLAYING GRAPHS

(75) Inventors: Mark Yablonski, Allen, TX (US);
Bradley N. Babin, Plano, TX (US);
Weylin J. Debetaz, Plano, TX (US)

(73) Assignee: i2 Technologies US, Inc., Dallas, TX (US)

( * ) Notice: Subject to any disclaimer, the term of this patent is extended or adjusted under 35 U.S.C. 154(b) by 558 days.

(21) Appl. No.: 09/680,603

(22) Filed: Oct. 8, 2000

Related U.S. Application Data

(60) Provisional application No. 60/158,651, filed on Oct. 8, 1999.

(51) Int. Cl.
*G06T 11/20* (2006.01)
(52) U.S. Cl. .............................. 345/440; 707/1; 707/2; 707/100; 707/101; 707/102; 715/853
(58) Field of Classification Search ................. 345/440, 345/581, 764; 715/853; 707/3, 100–102, 707/1
See application file for complete search history.

(56) References Cited

U.S. PATENT DOCUMENTS

| | | | | |
|---|---|---|---|---|
| 5,461,708 A | * | 10/1995 | Kahn | 345/440 |
| 5,528,735 A | * | 6/1996 | Strasnick et al. | 345/427 |
| 5,581,678 A | * | 12/1996 | Kahn | 345/440 |
| 5,861,885 A | * | 1/1999 | Strasnick et al. | 345/850 |
| 5,960,435 A | * | 9/1999 | Rathmann et al. | 707/101 |
| 6,073,134 A | * | 6/2000 | Shoup et al. | 707/100 |
| 6,122,636 A | * | 9/2000 | Malloy et al. | 707/102 |
| 6,167,396 A | * | 12/2000 | Lokken | 707/3 |
| 6,188,403 B1 | * | 2/2001 | Sacerdoti et al. | 345/764 |
| 6,205,447 B1 | * | 3/2001 | Malloy | 707/102 |
| 6,222,540 B1 | * | 4/2001 | Sacerdoti | 345/581 |
| 6,222,557 B1 | * | 4/2001 | Pulley et al. | 345/622 |
| 6,301,579 B1 | * | 10/2001 | Becker | 707/102 |
| 6,321,241 B1 | * | 11/2001 | Gartung et al. | 715/503 |
| 6,400,366 B1 | * | 6/2002 | Davies et al. | 345/440 |
| 6,456,997 B1 | * | 9/2002 | Shukla | 707/1 |
| 6,496,208 B1 | * | 12/2002 | Bernhardt et al. | 345/853 |
| 6,510,420 B1 | * | 1/2003 | Cessna et al. | 706/45 |
| 6,529,217 B1 | * | 3/2003 | Maguire et al. | 715/769 |
| 6,542,895 B1 | * | 4/2003 | DeKimpe et al. | 707/101 |

(Continued)

OTHER PUBLICATIONS

Lajos Fejes, et al., "Graphical Editor and Process Visualisation System for Dynamic Systems," Eurographics '91 Technical Report Series on Graphics Research & Development in European Community Programmes, Eurographics Technical Report Series, vol. EG 91 G R&D, ISSN 1017-4656, 16 pages, Date Stamped Nov. 25, 1991.

(Continued)

*Primary Examiner*—Jin-Cheng Wang
(74) *Attorney, Agent, or Firm*—Booth Udall, PLC; Steven J. Laureanti

(57) ABSTRACT

A system and method for displaying graphs on a computer display organize the data and axes of the display hierarchically. The user is allowed to select which levels of the hierarchy are to be displayed, thereby controlling the look of the display. Data at lower hierarchical levels is aggregated at the level chosen for display. By varying the chosen display levels, the user changes the nature of the display on the computer monitor.

18 Claims, 15 Drawing Sheets

U.S. PATENT DOCUMENTS 6,546,395 B1 * 4/2003 DeKimpe et al. ............ 707/101
6,628,312 B1 * 9/2003 Rao et al. .................... 715/853
6,665,682 B1 * 12/2003 DeKimpe et al. ............ 707/101
6,707,454 B1 * 3/2004 Barg et al. ................... 345/440

OTHER PUBLICATIONS

PCT, Notification of Transmittal of the International Preliminary Examination Report, 7 pages, Jan. 28, 2002.

* cited by examiner

SYSTEM AND METHOD FOR DISPLAYING GRAPHS

CROSS REFERENCE TO RELATED APPLICATIONS

This application claims the benefit of U.S. Provisional Application No. 60/158,651, filed Oct. 8, 1999, titled AGGREGATION MECHANISM FOR FUNCTIONAL GRAPHS.

BACKGROUND OF THE INVENTION

1. Field of the Invention

The present invention relates generally to computer system displays, and more specifically to a system and method for graphing functions over user selectable aggregations of input data.

2. Description of the Prior Art

The prior art has long been practiced on paper by mathematicians and more recently in computer graphics user interfaces (GUIs) by software engineers. The prior art graphs a function on a grid of two or three axes commonly labeled X, Y, and Z. One of the axes corresponds to the function output values; the other axis or axes correspond to function data inputs. The axes show relatively simple measurements such as Day of Week vs. Temperature. Point, line or bar displays within the grid display the function values. For instance, the grid could graph average, high, or low temperature functions given sets of temperatures read hourly during specific days. (See FIG. 1.) The prior art also includes multiple function graphs, in which the data axis (such as Day of Week) is subdivided by function. For instance, the Day of the Week axis could display Monday Average, Monday High, Monday Low, Tuesday Average, Tuesday High, Tuesday Low, etc. The graph would display three side-by-side bars for each day. (See FIG. 2.)

The prior art also displays hierarchically organized axes measures. For instance, the Day of the Week axis could display Monday morning, Monday afternoon, and Monday evening. (See FIG. 3.) This is no different from a ruler breaking its measure into inches and further into half inches, quarter inches, etc. The prior art additionally could combine multiple function graphs and hierarchically organized axes to display aggregate function values. For instance, the Day of the Week axis could display Monday, Monday Morning, Monday afternoon, Monday evening, etc. One bar would plot Monday's aggregate temperature over morning, afternoon, and evening; another would plot Monday Morning's temperature, etc. Thus, the reader could see the daily aggregate temperatures as well as the morning, afternoon, and evening temperatures. Another way of showing aggregations is by plotting them as separate functions, using different colors, shading, labeling, etc. to differentiate function values. (See FIG. 4.)

The prior art can also move the functional value axis to the grid. For instance, in a two dimensional graph, the function might be on both X and Y axes data, and the function value is displayed on the grid via a number or a bar scaled independently from the axes scales. Often such a bar is numbered as well. For example, the game Sim City™ displays a grid where the X and Y-axis coordinates are longitude and latitude geographic measures. Various bars on the grid show population statistics at the corresponding X and Y coordinates. The heights of the bars have nothing to do with the X and Y-axes—the bars are on their own scale, displaying population measures. The X and Y-axes are geographic measures in terms of miles. (See FIG. 5.)

The prior art also includes three-dimensional graphs, involving relatively simple X, Y, and Z-axis measures. The graph displays a function of X and Y axes data plotted against the Z-axis. (See FIG. 6.) Alternatively, as in the previous discussion, the function value axis is moved to the grid, displaying a function of data on all three axes. (See FIG. 7.) Such graphs are difficult to read on paper, but software rotation techniques and 3-dimensional perspective displays make this approach viable.

The prior art is practiced on both paper illustrations and GUIs. GUIs provide various navigation capabilities such as scrolling through the axes.

SUMMARY OF THE INVENTION

According to the present invention, a system and method for displaying graphs on a computer display organize the data and axes of the display hierarchically. The user is allowed to select which levels of the hierarchy are to be displayed, thereby controlling the look of the display. Data at lower hierarchical levels is aggregated at the level chosen for display. By varying the chosen display levels, the user changes the nature of the display on the computer monitor.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DESCRIPTION OF THE PREFERRED EMBODIMENT

The present invention employs a computer graphics user interface (GUI) to advance the state of the art in graphing functions. It improves over the prior art by providing a mechanism for displaying the functional values of user-chosen aggregates of the function's input data. Prior art systems can display aggregated values such as the temperature on Monday, along with the unaggregated values—the temperature on Monday morning, afternoon, and evening. The weakness in such graphs is that the viewer cannot choose the level of aggregation. In the previous example, the graph designer chose daily aggregations. A viewer might instead want to see weekly aggregations of various types, such as weekly average temperatures, weekly morning average temperatures, etc. Alternatively, the user might want to see the graph aggregated by weekdays and weekends. The present invention provides such a mechanism in a graphics user interface in which the graph axes are organized in hierarchies (tree structures) that the user can manipulate. One or both axes (in a 2 dimensional graph) can be so organized. In a three dimensional graph, one, two, or all three axes can be so organized. The user can navigate the graph in all manners common in the prior art (e.g.

scrolling). The user can select various levels of the hierarchies to see aggregate function values.

Figure 1:
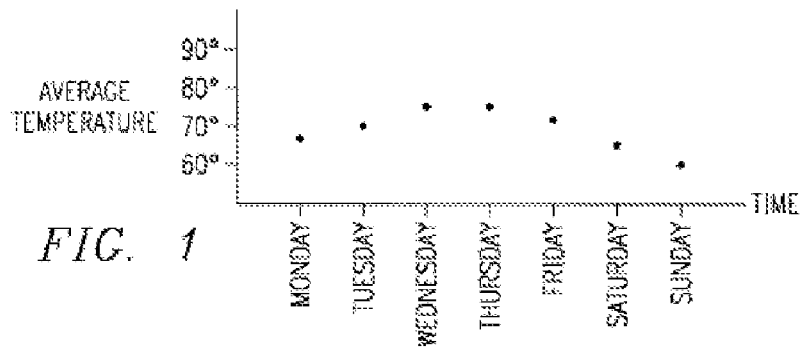
FIGS. 1-7 are graphs in accordance with prior art graphing techniques.
Figure 2:
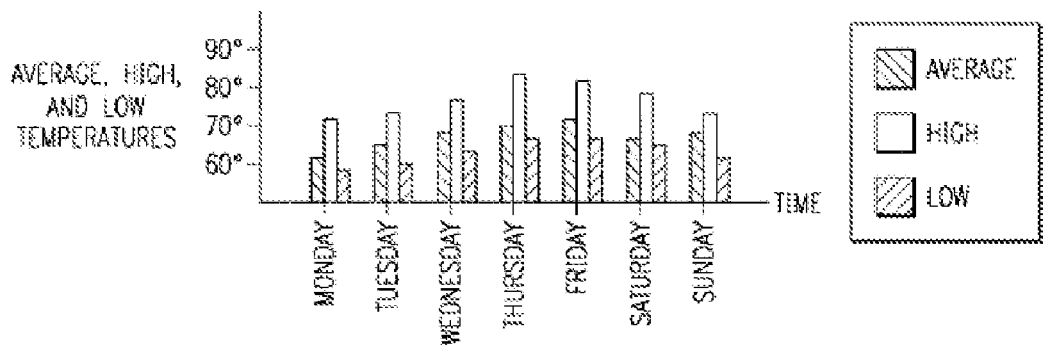
Figure 3:
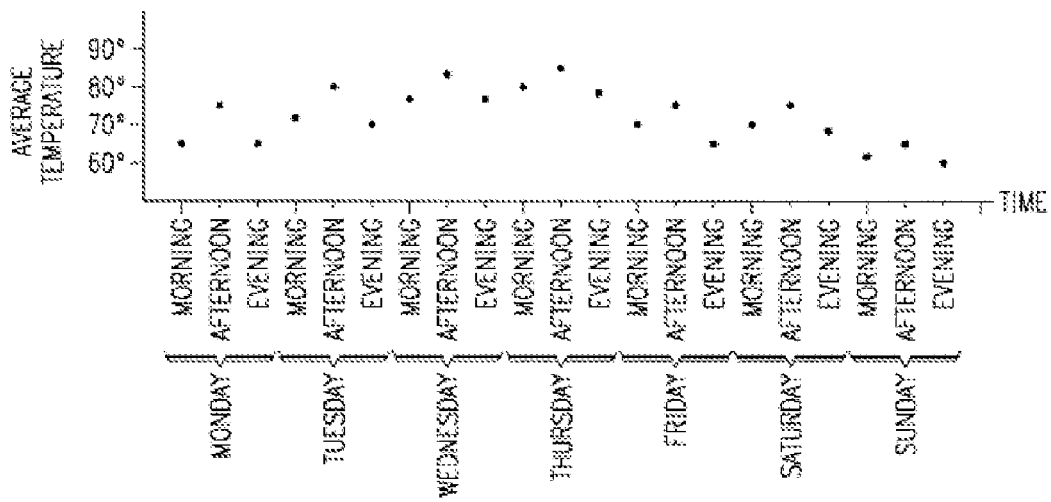
Figure 4:
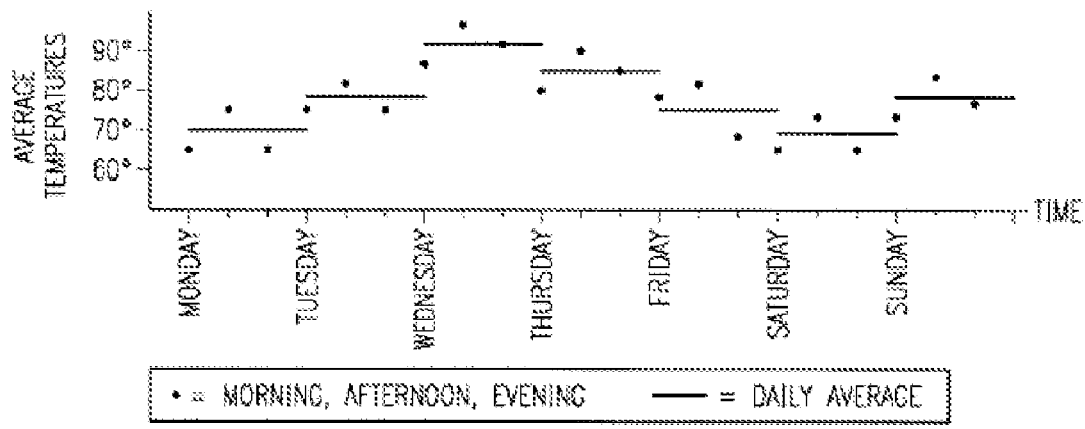
Figure 5:
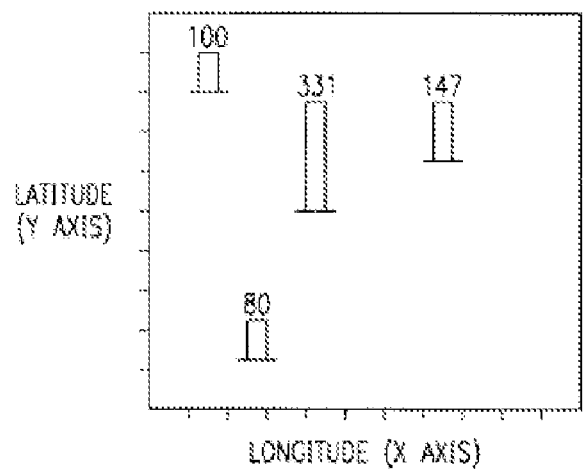
Figure 6:
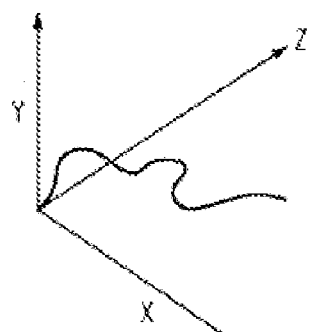
Figure 7:
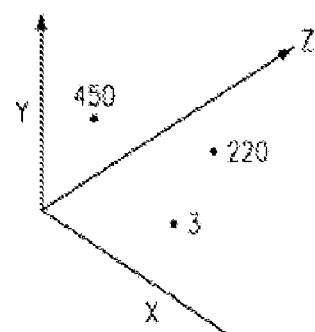
Figure 8:
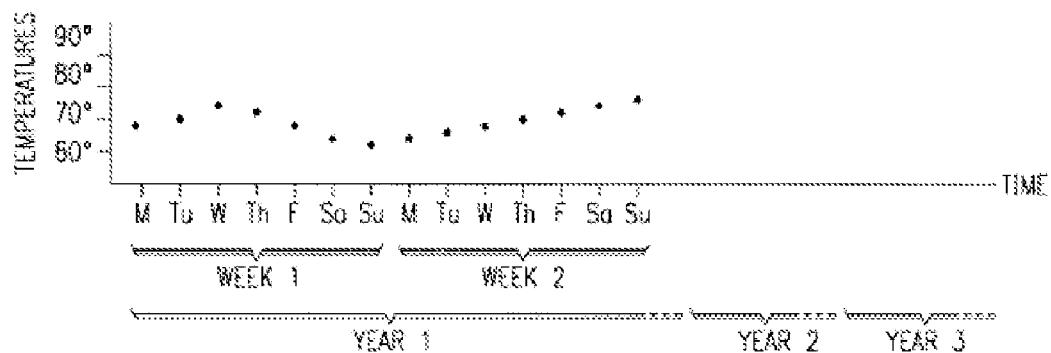
FIGS. 8-21 are graphs illustrating features of the preferred graphing technique.
Figure 9:
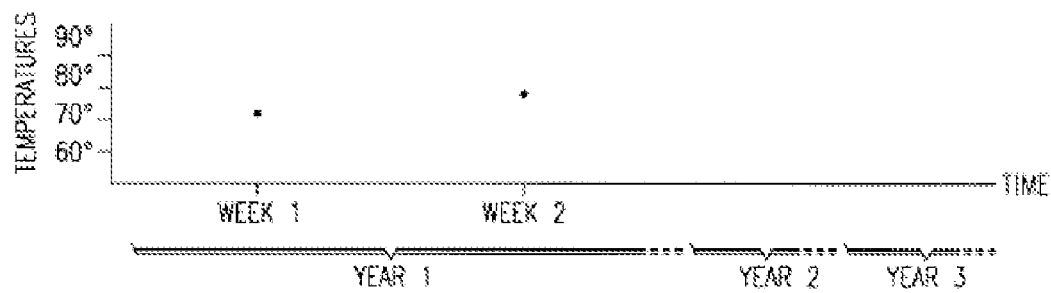
Figure 10:
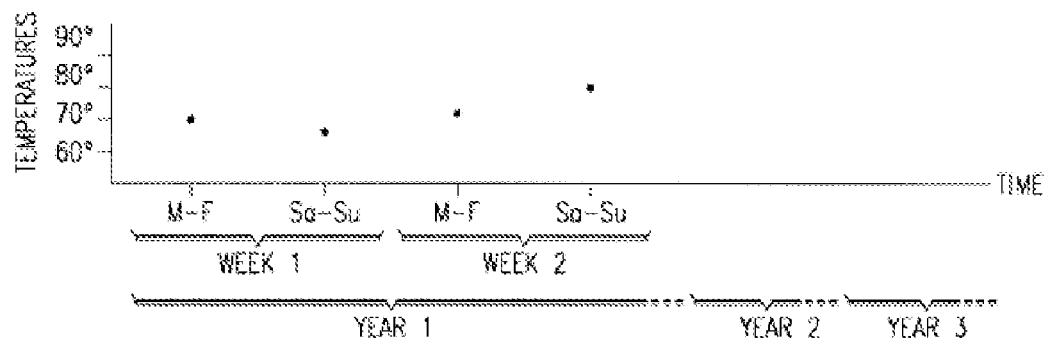

For example, FIG. 8 shows the graph of a function of time plotting values of temperature. Perhaps the function is average temperature given a set of temperature readings throughout each day. The time data has been organized in a time hierarchy with days at the lowest level, weeks at the next level, years above the weeks level, and Time itself at the top level. The days level has been selected initially, so the function values for each day are displayed. The user then selects a different hierarchy level to see a different level of aggregation. FIG. 9 shows that the user selected the weeks level, resulting in function values displayed for weekly aggregates of the input data. In this example, the graph shows average weekly temperature. The user can also select specific portions of a given hierarchy level to further refine the aggregation. In FIG. 10, the user has reselected the days level, grouped together weekdays, and grouped together weekends. The user can easily study weekday vs. weekend temperature variations in an application that may not have anticipated such a use.

These time vs. temperature examples show the convenience provided by the present invention. However the present invention is a key analysis tool in more complex applications such as manufacturing, where the user needs to view functions over complex hierarchies of data. Examples of such data hierarchies in manufacturing are:

Seller (sales force), organized hierarchically by geographic location. For instance, a Seller hierarchy could consist of the entire sales force at the top level. The second level could contain the worlds' continents. The third level could contain countries within each continent.

Product, organized by product family. For instance, the top level of the Product hierarchy could represent all products. The second level could contain various product groups, and the third level could contain products within each product group.

Time, organized by subdivisions of time.

The bottom layers of such hierarchies often break into vectors of data. For instance, at the bottom of the Seller hierarchy might be a vector of sales data containing Planned sales, Allocated Sales, and Actual Sales. If this were plotted vs. a Time hierarchy, the user could go up and down the Seller and Time hierarchies to have the graph answer such complex questions such as:
1. What were the Allocated Sales in North America last year?
2. What were the Allocated Sales in the United States last year?
3. What were the Actual Sales in the United States the $1^{st}$ quarter of last year?

The seller hierarchy designer has established that Planned Sales, Allocated Sales, and Actual Sales are a vector of numbers to display at each cell of the grid. The user however can issue instructions to compose a special function to display, built on values in the vector—a feature provided in current spreadsheets. For instance, the user could plot Actual Sales minus Planned Sales.

The user can additionally filter out portions of one or both hierarchies to answer such questions as:
4. What were the Allocated Sales in North America and Asia (but not Europe nor South America) last year?
5. What were the Allocated Sales in North America and Asia (but not Europe nor South America) during the $1^{st}$ quarters of the last five years?

To view such numbers, the user selects nodes Europe and South America and executes a Filter command. Europe and South America then disappear from the Seller hierarchy and are placed in a small separate window, to remind the user that they've been filtered. During the rest of the session, all aggregated values normally involving Europe and South America are adjusted, deducting the numeric contributions of Europe and South America. At any time during the rest of the session, the user can click on items in that window to remove their filters.

Figure 11:
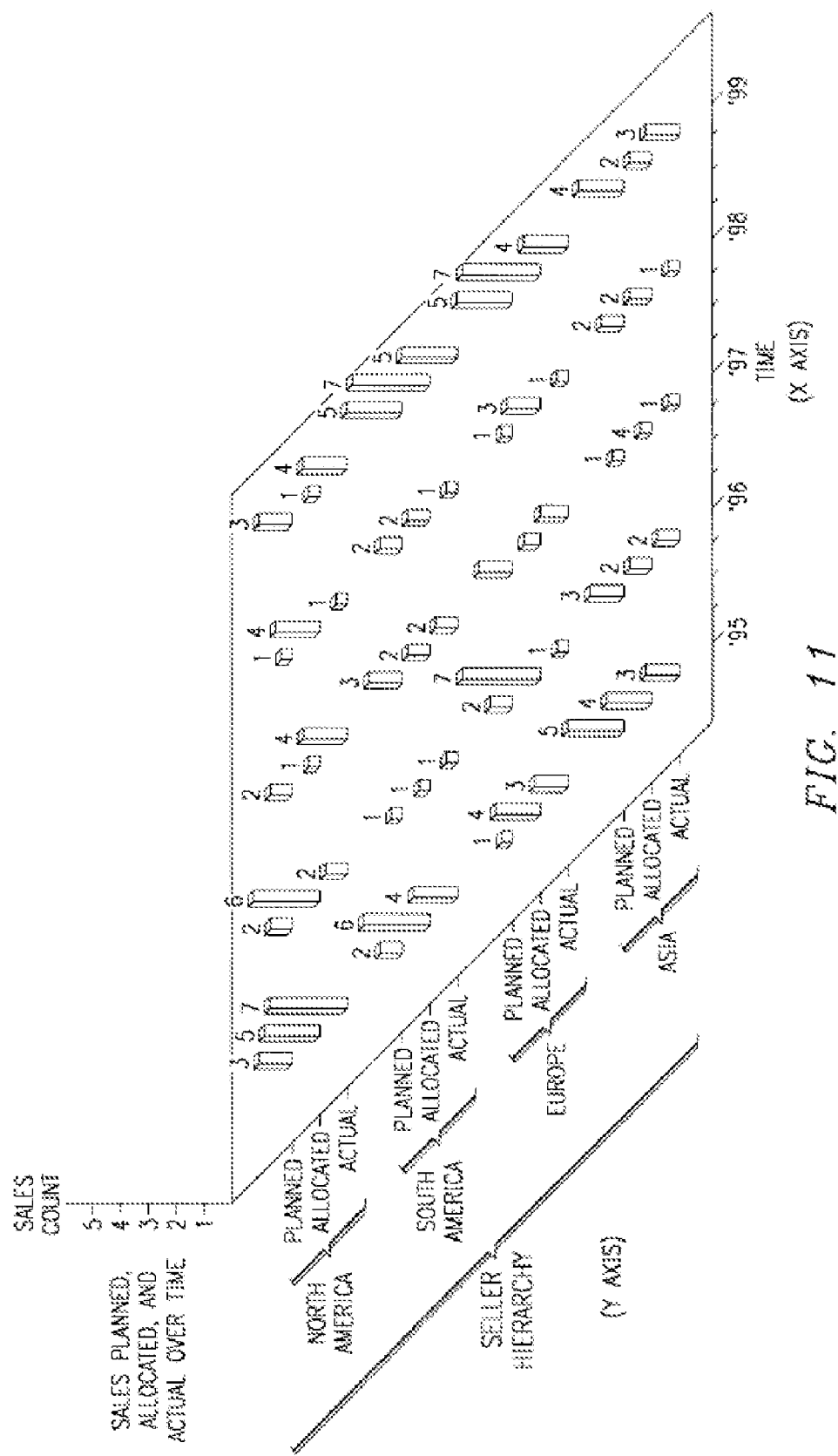

FIG. 11 plots such a sales hierarchy vs. a time hierarchy on a 3-dimensional graph. The various sales figures are displayed using the vertical axis as well as numeric labels. The following discussion will review each of the previous five questions to see how the user employs the preferred embodiment's navigation tools to get the answers. Various features of the invention will be described in this context.

Figure 12:
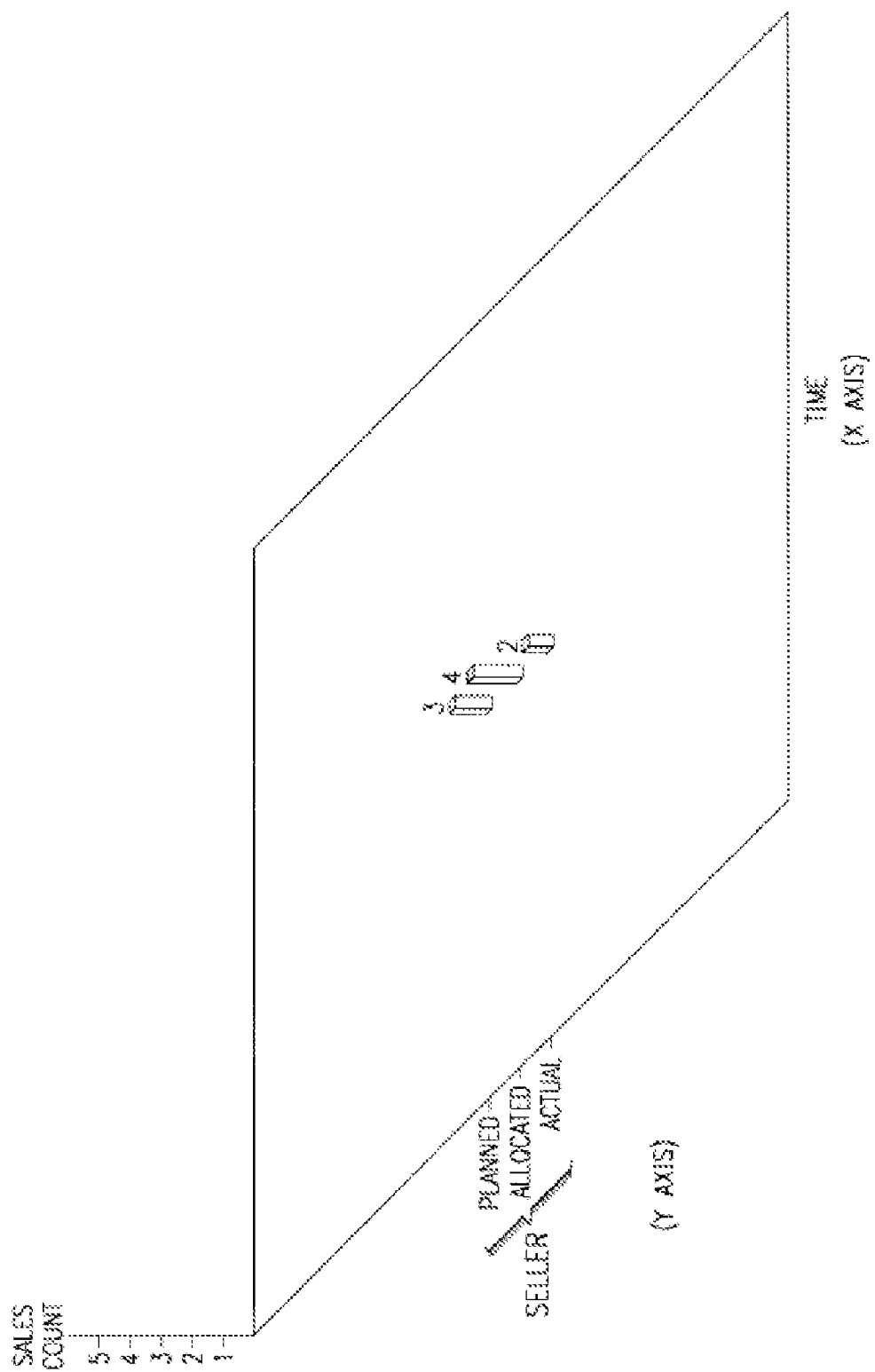
Figure 13:
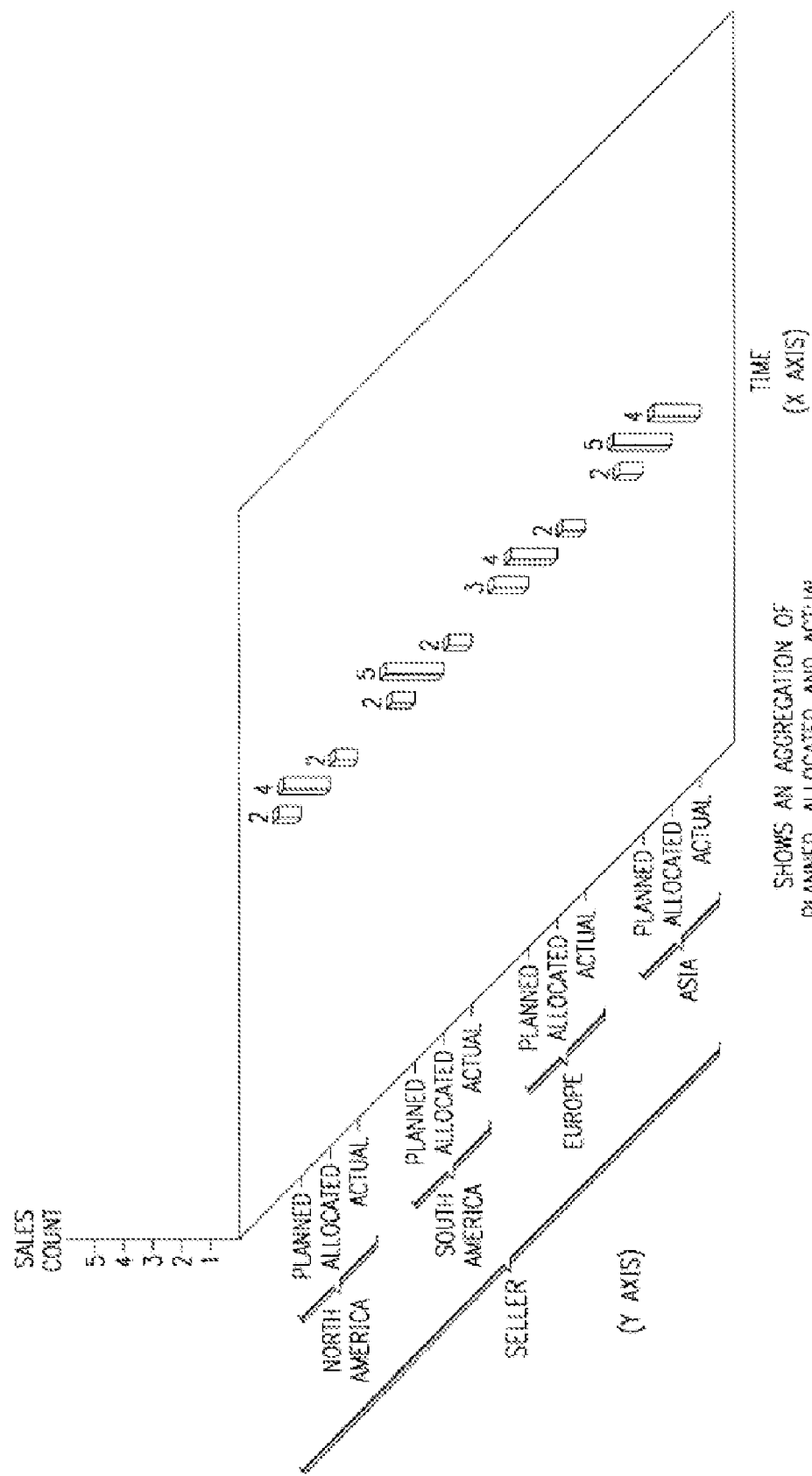
Figure 14:
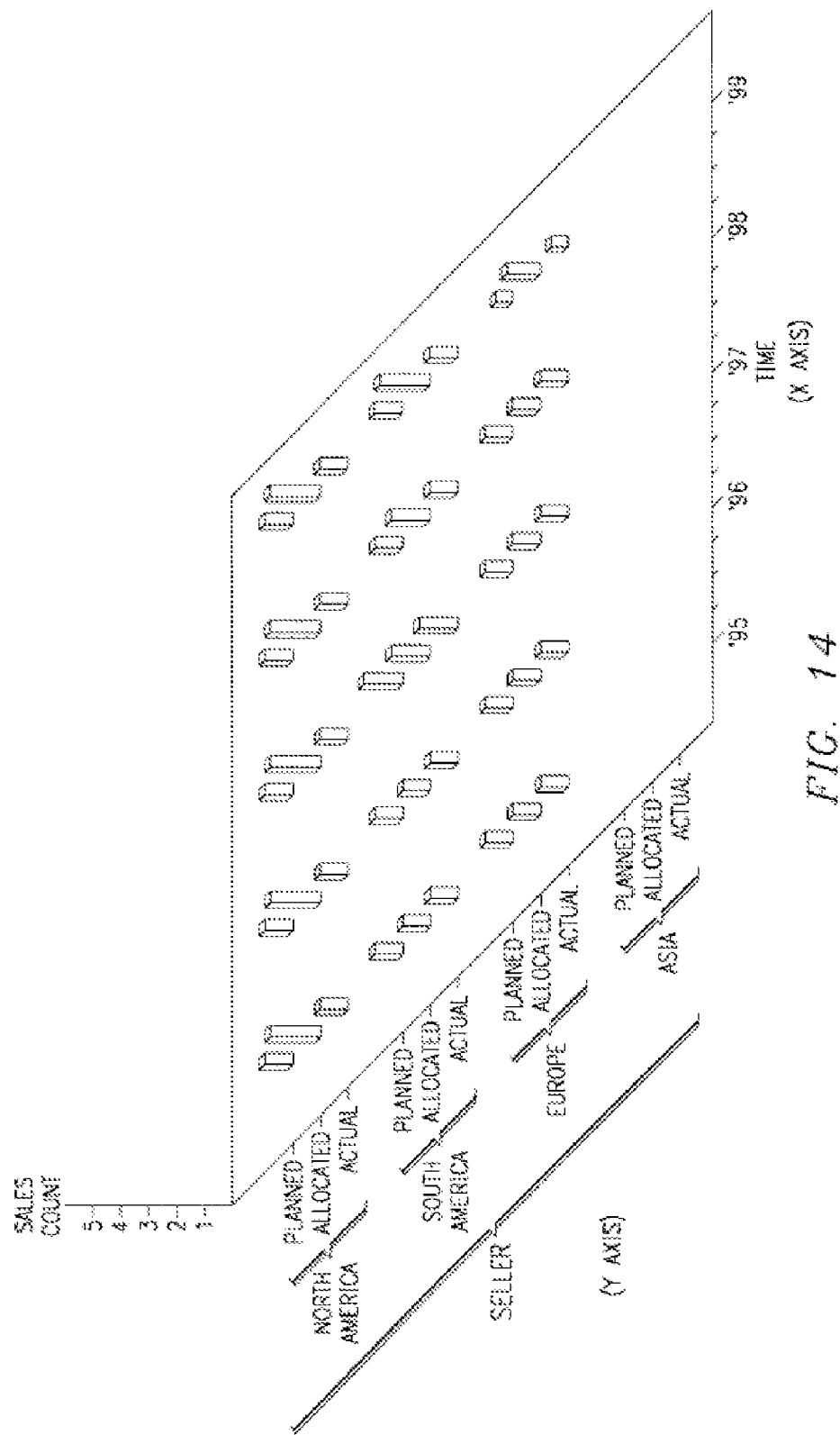

Suppose initially the Y-axis shows Seller and the X-axis shows All Time, a 5-year history time horizon. (See FIG. 12.) Using a mouse or other selection mechanism, the user would select Seller to break the axis into North America, South America, Europe, and Asia. (See FIG. 13.) The user would select Time to break it into 5 previous years. (See FIG. 14.) On this selection, the grid changes from displaying sales figures aggregated across all of time to yearly aggregated sales figures. To answer question 1, the user cross references North America vs. '98 (last year) and looks at the bar displaying Allocated Sales.

Figure 15:
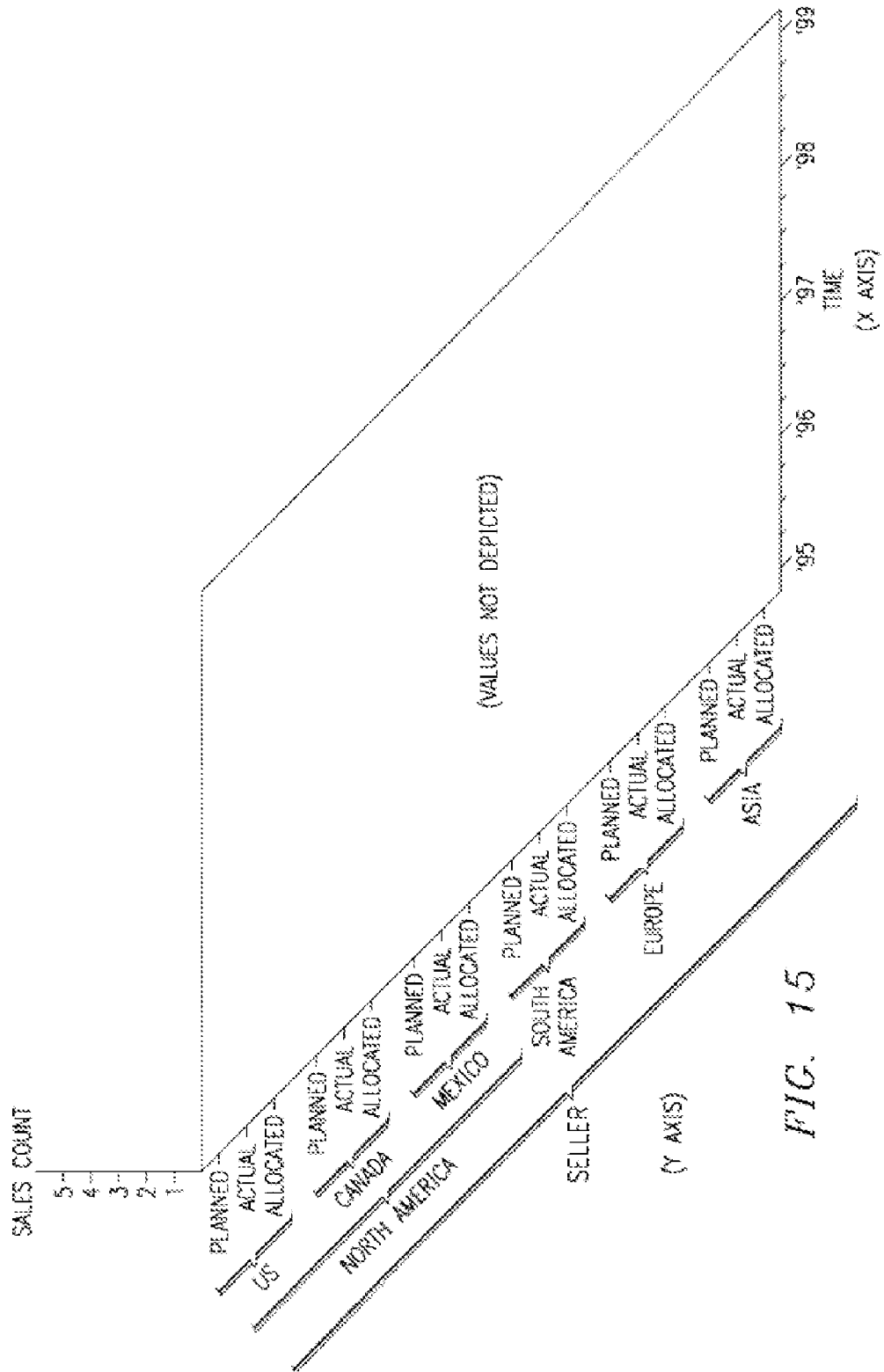
Figure 16:
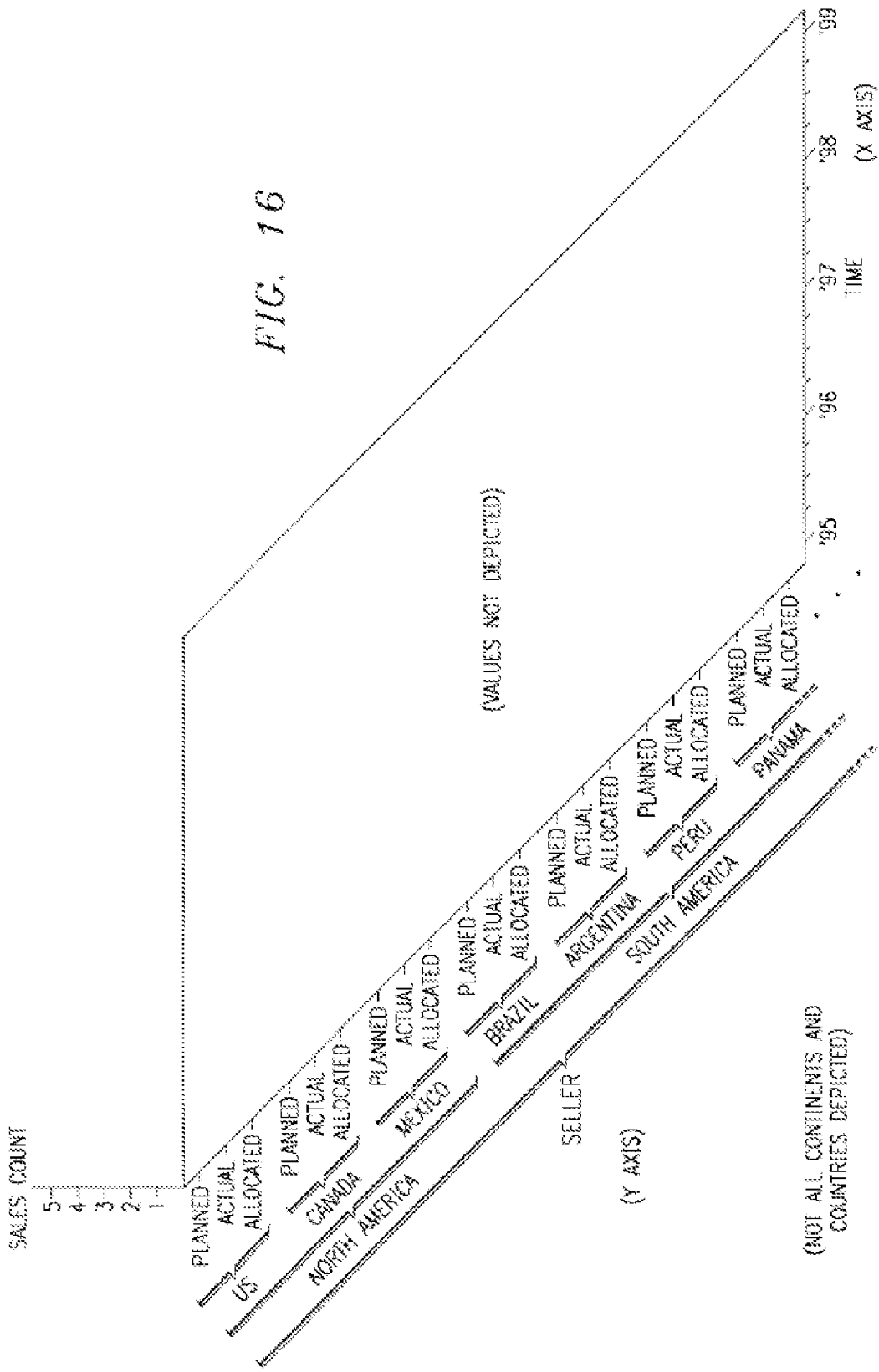

The user then navigates to answer question 2 by selecting North America, breaking it into each country, and then cross referencing the United States vs. '98. (See FIG. 15.) Actually, the user has two options when drilling downwards in a hierarchy. In FIG. 15, the user selected the option of expanding the next level only under the selected North America. FIG. 16 shows the option of expanding the entire next level (to view all countries under all continents). However, by expanding only portions of a given level, the user can display a comparison of sales figures for a given country vs. a given continent, or the $1^{st}$ quarter of this year vs. all of last year. Command modes, mouse buttons, menus, or other GUI mechanisms are used to select among the two options in a manner well known in the art.

Figure 17:
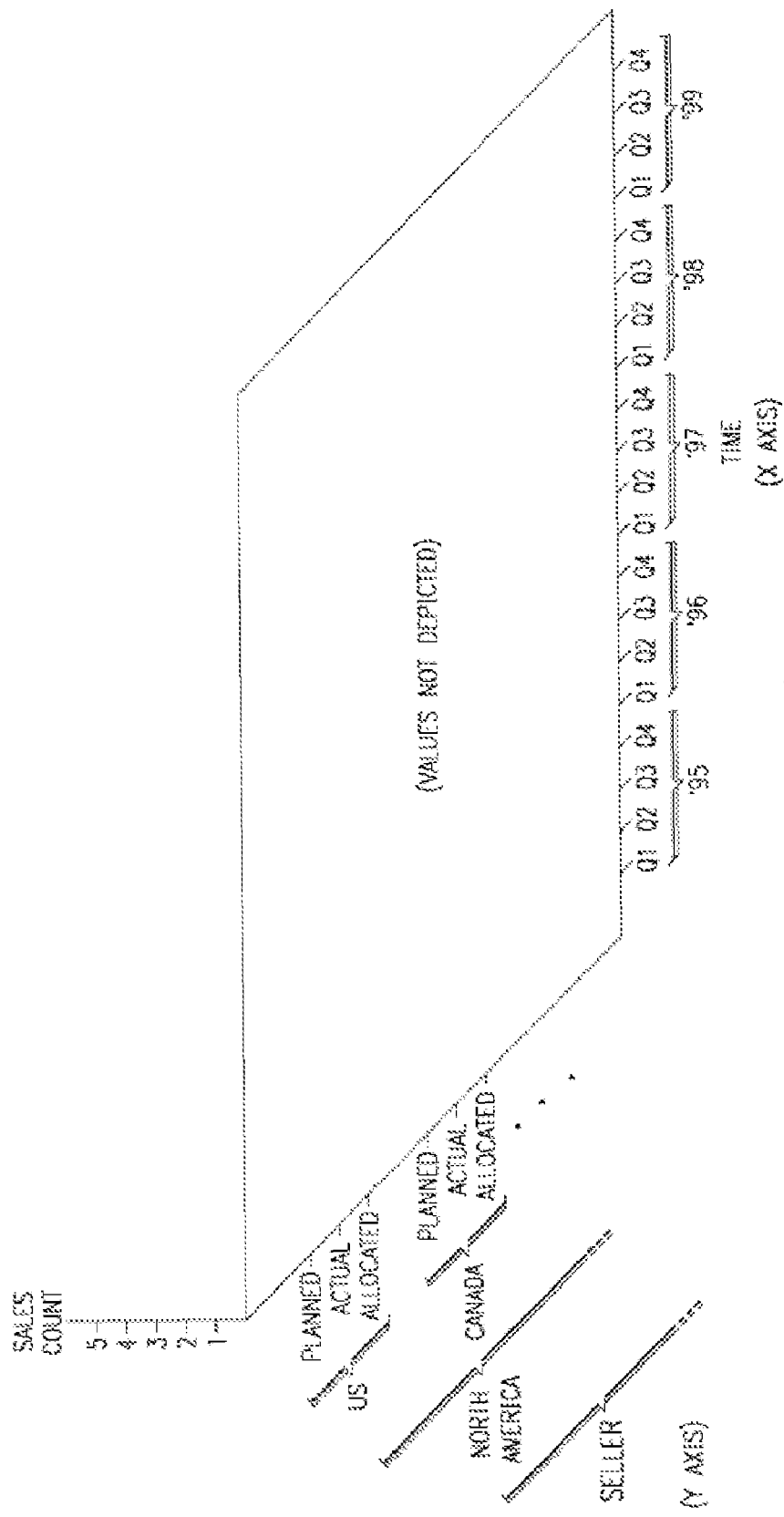

The user then navigates to answer question 3 by selecting '98, breaking it into quarters. (See FIG. 17.) Since the grid is displaying various functions including Actual Sales, the user does not need to do anything special to view that number. The user simply cross-references, the United States vs. '98's $1^{st}$ quarter. Note that the present invention allows choice points at these selections. In this example, the GUI might ask (via popup menu, prompt, or other methods) the user whether to break '98 into quarters, weeks, months, days, etc. Instead of offering just a single hierarchy for each axis, the present invention offers multiple alternate hierarchies for each axis.

The user then navigates to answer question 4 by issuing a command to go up a level in the Seller hierarchy to display the continents. The user then selects two of those continents, North America and Asia, to get some specified mathematical combination of their function values, such as averaging or summation. (In this example, one could view the average actual sales, the summed planned sales, etc.) The grid now displays combined sales data for the two selected continents. (Such combinations can be much more efficient than the user manually summing the sales numbers for selected continents. The present invention provides spreadsheet-like capabilities so that the user can compose complex functions from atomic functions such as summation, MIN, MAX, or AVERAGE.) The user then issues a command to go up a level in the Time hierarchy (from $1^{st}$ quarter of '98 to all of '98).

The user then navigates to answer question 5 by going down the Time hierarchy to the yearly quarters, then selecting the 1$^{st}$ quarters of the last five years to get summed sales data on those quarters.

In prior art graphs, the plotted function values, are simply numbers. However, the present invention allows for the possibility that the function values are themselves hierarchically arranged numbers. The user can navigate through this value hierarchy in a manner similar to the navigation through the axis data hierarchies. The only difference is that the hierarchy template for such navigation occurs in a legend placed separately from the graph. For instance, suppose we graphed Seller hierarchy vs. Product hierarchy on a 2 dimensional graph. Suppose we wanted to graph sales numbers by product by different time periods (in a time hierarchy). We could change the design to employ a 3 dimensional graph, with Time hierarchy as the Z-axis. However, perhaps for our particular data, this would be unreadable. Instead, we have the grid display the sales numbers, broken out by whatever time segments of the time hierarchy the user chooses. The Time hierarchy legend would provide Last 5 Years at the top level, Each Year at the next level, each quarter at the next level, etc. By clicking on these various levels, the grid would display one bar for all 5 years, or 5 bars for each year, or 20 bars for each quarter, etc. (See FIG. 18.) As with the axes hierarchies, the user can perform combination and filtering on the value hierarchy. For instance, he could combine the first three years' values or filter out all but each year's 1$^{st}$ quarter values, all through mouse commands performed on the value hierarchy legend.

Why would a user wish to create such complex functions of three data hierarchies? The following are practical questions that such a graph would easily answer:

What is the Planned Allocation during 2nd Quarter '99 for Texas for Product A?

What is the Planned Allocation during 2nd and 3rd Quarters '99 for the US for Product Group 100?

The present invention's mechanism for graphing hierarchically organized data is trivially extended to accommodate other more general data organizations such as lattices and directed graphs. (Here, the term "graph" refers to the data structure, not the function plotting device.) A lattice is accommodated by searching the lower levels of the hierarchy under a given selected level. Whenever a lower level element is encountered more than once, the repeated encounters are ignored. Otherwise, the data for that element would be counted multiple times in aggregating the input data. A directed graph is accommodated by defining at each level the set of lowest levels. As the user drills down the hierarchy, the lowest levels may actually change, if the graph has a loop and the defined sets of lowest levels for given selected levels differ.

An example of a directed graph application of this invention is a traffic analysis application with a truck or train route directed graph axis and a time axis. The grid might display traffic data. The route axis is organized as a directed graph of cities connected by highways. One can select a given city to see information about traffic going from that city to other cities along the truck route.

The present invention provides a spreadsheet-like functionality in which the user changes a graphed value and then updates the window to display resultant changes in aggregated values. For instance, suppose the Planned Allocation for 1$^{st}$ Quarter '99 for Texas for Product A is 20. This value of 20 contributes to many possible aggregate values, including the Planned Allocation for 1$^{st}$ Quarter '99 for US for Product A, which might be 150. Suppose the aggregate function is summation. If the user changes the 20 value to 40 and then selects the above aggregation, the grid will display 170 instead of 150. 20 is an editable value, in this case, because it is a value of leaf nodes of the axis hierarchies. 150, however, is not an editable value, because it is the value of non-leaf nodes of the axis hierarchies.

Figure 19:
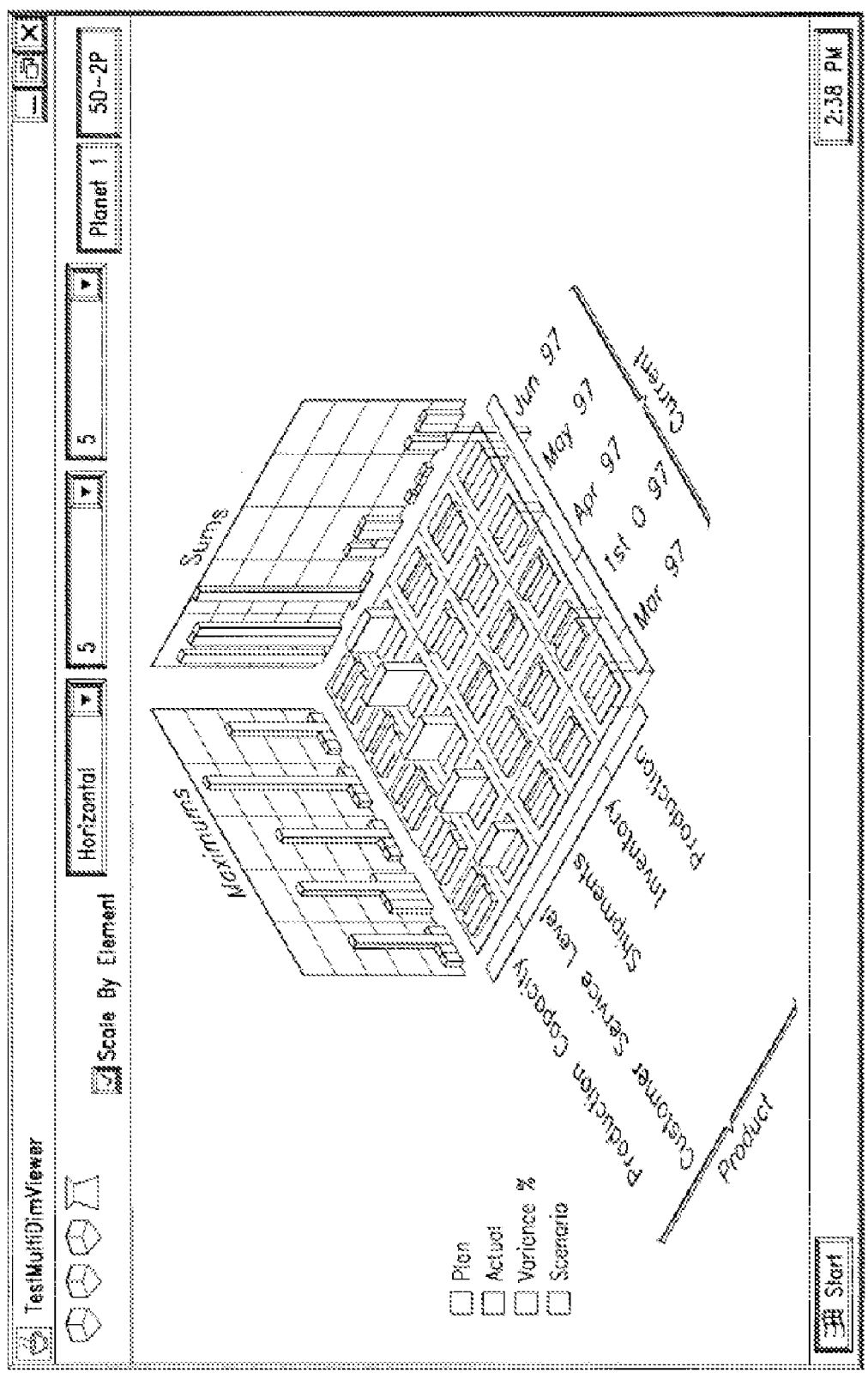
Figure 20:
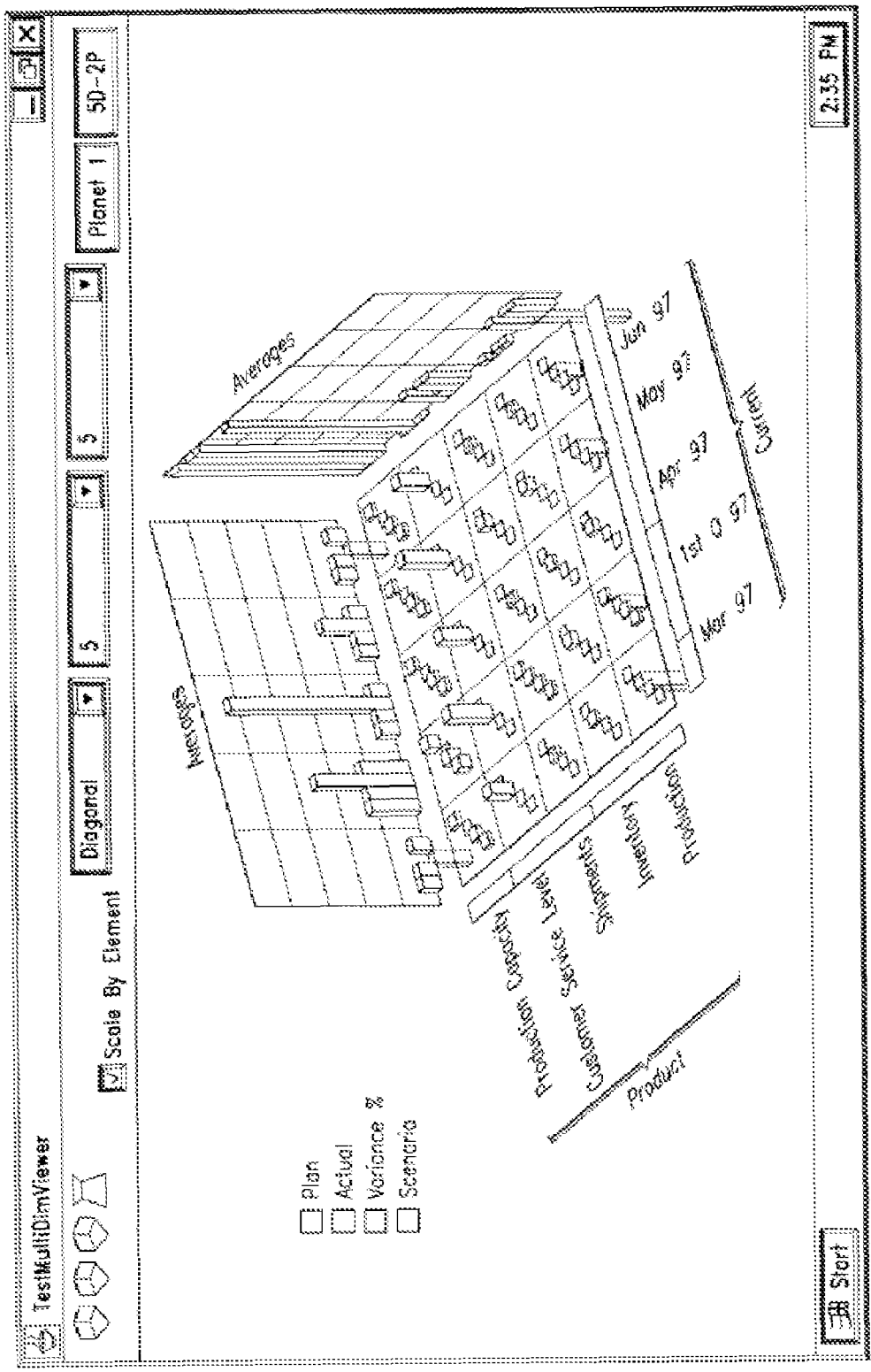
Figure 21:
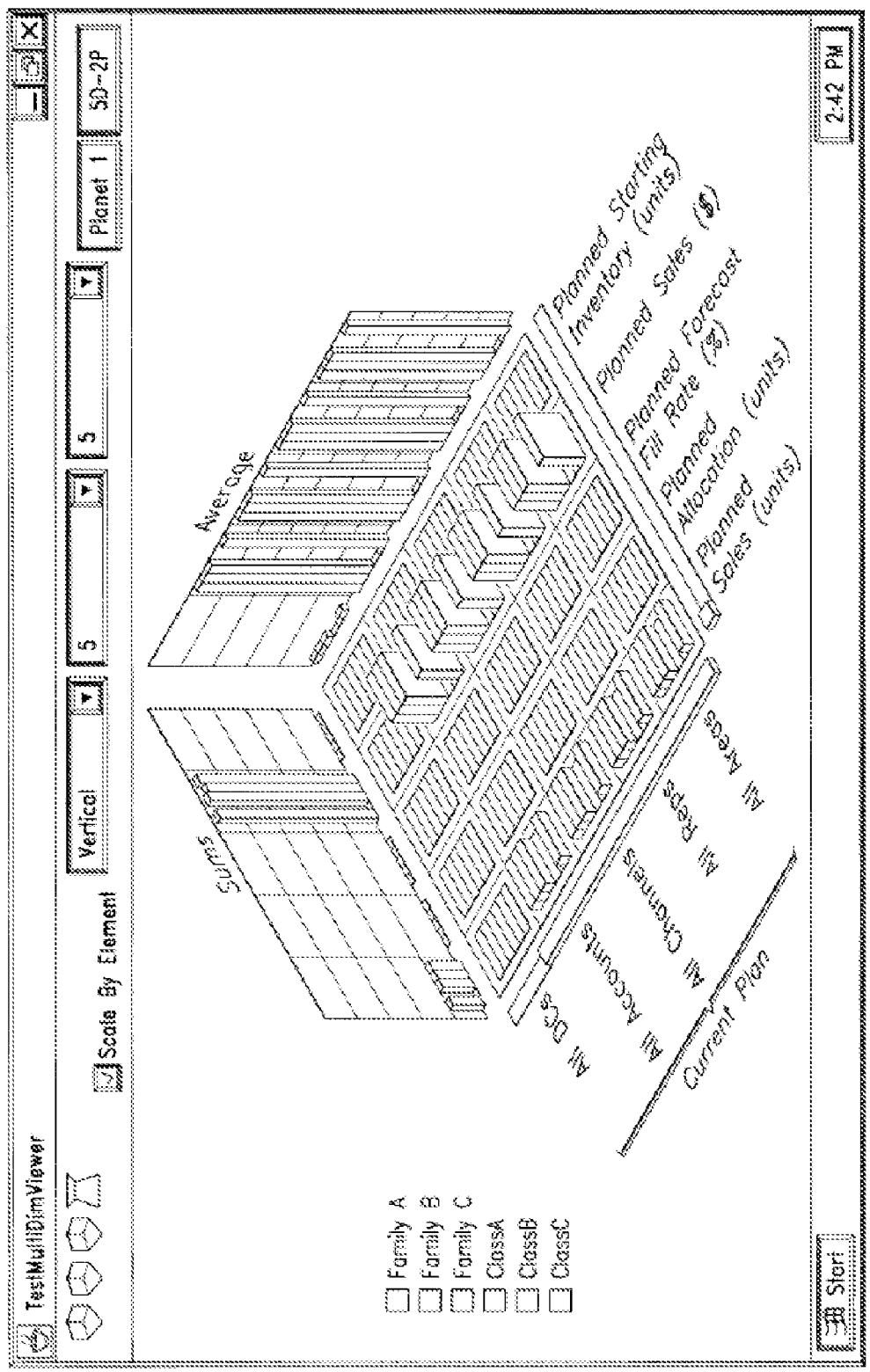

The present invention combines very elegantly and powerfully with the three dimensional graphing capabilities of available products such as the florr/wall/wall graphing product, available from i2 Technologies. See FIGS. 19-21 for various examples of Seller vs. Product hierarchies, integrated with the 3-D viewing mechanism of that product. These illustrations show a floor-leftwall-rightwall graphic architecture where the floor is the present invention, a graph of two hierarchical axes data. The left wall and right wall are mathematical summarizations (selected formulas such as min, max, or average) of the functional (grid) values.

There are many potential applications outside of manufacturing. For example, any organization can provide hierarchical axes of information such as an organization chart vs. geographic location, and graph function values such as salary data, expense data, or skills. Those interested in financial and portfolio management can use industry sectors and company sizes as the hierarchical axes, and plot function values of expected and actual returns, or current investment allocations. Manufacturing specific data can include, for example, hierarchical axes selected from parts, products, suppliers, customers, facilities by geography, size or other measure, time, plans, or measurements. Corresponding plotted data can include any numeric data such as inventories, demand, return-on-investment, expenses, performance, allocations, and many others. Those skilled in the art will appreciate that many different type of data can be graphed using the techniques described herein.

Method Details

Figure 24:
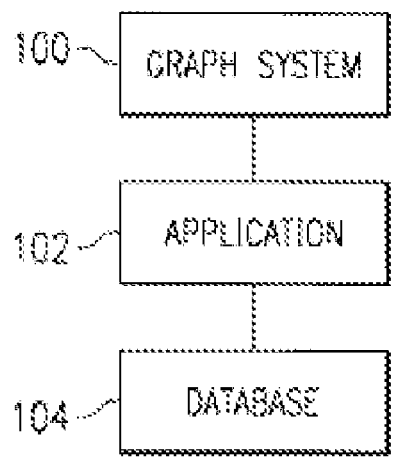

This section describes the procedures that implement the preferred embodiment of the present invention. This invention comprises a generic GUI mechanism appropriate for many types of applications. An example structure for using the described method is shown in FIG. 24, in which the described procedures are placed in a generic Graph System 100, driven by an Application 102 that has its own Database 104 whether memory resident or on an external disk drive. However, the invention is not limited to such an organization. The Graph System 100 could be implemented as non-generic software imbedded in the Application 102, for example.

It will be recognized by those skilled in the art that the procedures described herein have alternatives that could be proved to be logically identical. For instance, suppose a procedure requires two steps A and B that can be executed in either order without different results. The invention is not restricted to the order A, then B, just because the procedure is described in the order A, then B. The procedures are expressed using a number of external functions that Application 102 passes to Graph System 100 for it to call at various stages of its processing. Instead of such external functions, the Application 102 could pass the Graph System 100 a table of results of the functions given various inputs. The procedures are not expressed in an Object Oriented framework, but many Objected Oriented versions of these procedures are logically equivalent to the following descriptions.

Note that procedures expressed in terms of external functions may appear to have certain performance characteristics such as quadratic performance. However, use of caching by these functions can improve the performance, e.g. from quadratic to linear performance.

Initialize-Graph( )

This procedure is used by Application 102 to send Graph System 100 the axis hierarchy structures, various external functions for retrieving graph values and computing value aggregations, and default GUI settings.

Step 1. Application 102 sends Graph System 100 the number of axes to graph (either 2 or 3).

Step 2. For each axis,

Application 102 traverses Database 104, informing Graph System 100 of all hierarchy nodes. Each hierarchy-node is a record consisting of the following:

(1) label, a string describing the node's representative section of the hierarchy. In a Seller hierarchy, example labels would be North America, United States, Planned Sales, Actual Sales, and Seller (the top of the hierarchy).

(2) subhierarchies, a list of subhierarchy records each consisting of:

(a) child-nodes, a list of hierarchy-node records. This list is never empty. When this list has one node, that node is the sole subtree of this hierarchy-node. When this list has more than one node, each is an alternative subtree of this hierarchy-node. In such situations, the user has a choice of aggregation methods. For instance, a Year could have the following subhierarchies: Monthly, Weekly, and Quarterly. A Salesman hierarchy could have the following subhierarchies: By Location, By Product Group, By Seniority, By Performance Rating.

(b) selection-label, a string used in pop-up menus or other GUI mechanisms employed by Graph System to have the user select among subhierarchies.

When this list is empty, this hierarchy-node is a leaf of the hierarchy tree.

(3) initial-subhierarchy, the initially selected subhierarchy among the subhierarchies. When subhierarchies of the various nodes have more than one member, there are essentially multiple combinations of hierarchies that Graph System could display. The initial-subhierarchies of all nodes provide Graph System the initial hierarchy to display.

(4) Leaf?(node, selected-nodes), an external function that returns True if 'node' is a leaf node of the hierarchy. Otherwise it returns False. When the hierarchy is a tree (the most typical situation) or a lattice, Leaf? should return True if its currently selected subhierarchy has no child-nodes, and the selected-nodes argument should be ignored. Because this case is so typical, Application 102 can omit this field and accept a default function from Graph System 100 that does this. When the hierarchy is a graph with cycles, Leaf? needs to be computed based on, selected-nodes, which is the current set of selected hierarchy nodes. Application 102 has to traverse down from selected-nodes towards 'node', deciding how far down to traverse before leafs appropriate to that set of selected nodes are reached. (The presence of cycles means there may not be actual leafs—a traversal length within such cycles has to be decided.)

Step 3. Application 102 sends Graph System 100 an external function value-lookup(xnode, ynode) if step 1 specified two axes, or value-lookup(xnode, ynode, znode) if step 1 specified three axes. The arguments are hierarchy-node records that are leaf nodes of the hierarchy. The function returns a value for Graph System 100 to plot at the grid's cross-reference point of xnode, ynode, and (if present) znode. For instance, in FIG. 11, suppose our xnode is the "planned" node under North America and our ynode is '95. Value-lookup applied to these two nodes would return 3.

Note that if the hierarchy is a cyclical graph, value-lookup has to return a value for every combination of nodes among those returned by the various BOTTOMS functions.

If Application 102 wishes editing capabilities on the values returned by value-lookup, Application 102 Sends Graph System 100 an external function value-edit(xnode, ynode) or value-edit(xnode, ynode, znode). This function handles the I/O needed to retrieve the new value from the user and then changes the corresponding value that is returned by value-lookup on these same arguments.

Step 4. Application 102 sends Graph System 100 a set of Aggregation-Method records, each consisting of:

(1) aggregate-value(values-list), an external function. Values-list is a list of values over which this function computes and returns an aggregate value. The list might contain numbers, and the appropriate aggregation computation might be SUM or AVERAGE. The value returned by aggregate-values and the members of the values-list must have the same data type as that returned by the value-lookup function of step 3. Graph System 100 will use this function to plot aggregated values whenever non-leaf members of the hierarchy are selected. (For leaf members, Graph System 100 can simply use value-lookup.) Aggregate-values should return first(values-list) whenever values-list has only one member.

(2) method-label, a string used in pop-up menus and other GUI mechanisms for the user to select their desired aggregation method.

In many applications, only one Aggregation-Method record will be provided, leaving no choice for the user. The most common aggregate-value function is SUM. Another common function is AVERAGE.

The remaining sections will refer to the user's currently selected aggregation method by its contained function, aggregate-value(values-list).

Step 5. Application 102 informs Graph System 100 about how to present and scale the graph, using methods known in the art. For instance, plotted values may be presented a bars, lines, points, etc. Presentation includes coloring, shading, labeling, axes scales, scrolling control, and other GUI issues.

Application 102 informs Graph System 100 of the nature (data type) of each cell value and exactly how cell values are to be displayed. In the simplest case, cell values are numbers. However, as described earlier, cell values might be vectors or even hierarchies (trees) of numbers. They might be symbolic values. Graph System 100 provides special formatting options for each type. (The procedures required to handle cell vectors and cell hierarchies are described below.)

Step 6. Graph System 100 determines the nature of the hierarchy using known graph traversal methods in the computer science sub-fields of data structures and graph theory. Here "graph" is used in its mathematical sense. The nature of the hierarchy is commonly a tree structure but could be a lattice or directed graph. If not a tree, Graph system 100 knows in procedures such as Plot-Values to look for repeated nodes during aggregation.

Step 7. Application 102 informs Graph System 100 of the initially selected nodes for each axis. Commonly each axis hierarchy is a tree and the application sets the top or bottom nodes of each hierarchy.

Bottoms(Node)

This function is used internally by Graph System 100 to determine the leaf nodes under 'node'. 'node' may be several hierarchy levels above the leafs, it might be the parent of leafs, or it might itself be a leaf. A set of the leafs is returned. The procedure is:

Let S=an empty set that prohibits adding duplicate members into itself.
If node.leaf?(node, selected-node)
Then
   Add node to S.
Else
   For each node CHILD in node's currently selected subhierarchy's child-nodes list,
     If CHILD is not in filtered-nodes
       Add members of Bottoms(child) into S
Return S.

Selected-nodes is the global list of selected axis hierarchy nodes. Filtered-nodes is a procedure discussed below. Bottoms can be optimized by passing S as a second argument to Bottoms, which then populates S instead of creating and returning its own set.

Plot-Values( )

At all times, the user has selected one or more nodes in the X axis hierarchy, one or more nodes in the Y axis hierarchy, and (if there is a Z-axis), one or more nodes in the Z axis hierarchy. Whenever the user changes the selected nodes, Plot-Values is called to determine the values to display in the grid area of the graph. For every combination of X-axis, Y-axis, and Z-axis nodes, Graph System has to plot a value on the grid. If a combination contains only leaf nodes, Graph System 100 can simply call value-lookup(xnode, ynode, znode) for the plotted value. However, when a combination contains at least one non-leaf node, Graph System 100 must plot an aggregation of the combinations of underlying leaf node values. For instance, suppose we have the following leaf-node combinations and values:

value-lookup(xnode1, ynode1)=10
value-lookup(xnode1, ynode2)=20
value-lookup(xnode2, ynode1)=40
value-lookup(xnode2, ynode2)=30

If xnode1, xnode2, ynode1, and ynode2 are all selected, then the above four values are all displayed on the grid. Now suppose the following: SUM is the user's currently selected aggregate-value(value-list) function, and xnode1 and xnode2 are under parent node Xnodes in the X axis hierarchy. If the user selects Xnodes, consequently deselecting xnode1 and xnode2, Graph System removes the four plotted values and plots the following two values:

1. the value of Xnodes vs. ynode1, which is the aggregate of the values of the leaf nodes under Xnodes (xnode1 and xnode2, obtained via BOTTOMS(Xnodes)) vs. ynode1. Specifically, the computation is:

$$\text{aggregate-value}(\{\textit{value-}\text{lookup}(\textit{xnode}1, \textit{ynode}1),$$
$$\text{value-lookup}(\textit{xnode}2, \textit{ynode}1)\}) = \text{aggregate-value}(\{10,40\}) = 50$$

2. the value of Xnodes vs. ynode2, which is the aggregate of the values of the leaf nodes under Xnodes (xnode1 and xnode2, obtained via BOTTOMS(Xnodes)) vs. ynode2. Specifically, the computation is:

$$\text{aggregate-value}(\{\textit{value-}\text{lookup}(\textit{xnode}1, \textit{ynode}2),$$
$$\text{value-lookup}(\textit{xnode}2, \textit{ynode}2)\}) = \text{aggregate-value}(\{20,30\}) = 50$$

We've stepped through the plot-values algorithm on a particular example. Now the formal algorithm is as follows:
Clear the grid of the currently displayed values.
If any top node of any axis hierarchy is in filtered-nodes, return.
Let xnode be each selected node in the X axis hierarchy.
Let ynode be each selected node in the Y axis hierarchy.
Let znode be each selected node in the Z axis hierarchy.
The following is executed on each combination of xnode, ynode, and znode:
   Let value-components be an empty list whose members are the same type as value-lookup.
   Let xleaf be each node in the set returned by BOTTOMS (xnode).
   Let yleaf be each node in the set returned by BOTTOMS (ynode).
   Let zleaf be each node in the set returned by BOTTOMS (znode).
   The following is executed on each combination of xleaf, yleaf, and zleaf:
     PUSH value-lookup(xleaf, yleaf, zleaf) ONTO value-components.
   Plot at the grid location corresponding to the cross-reference point of xnode, ynode, and znode the value of aggregate-value(value-components).

If there is no Z-axis, Graph System 100 simply executes an alternate version of the above algorithm in which all references to Z-axis, Znode, and Zleaf are removed.

This procedure can be optimized by avoiding calls to aggregate-value whenever a combination of xnode, ynode, and znode are leaf nodes of their respective hierarchies. If all three are leaf nodes, the algorithm just plots value-lookup (xnode, ynode, znode). If no Z axis exists, this principle still applies and the algorithm just plots value-lookup(xnode, ynode).

Drill-Down(Node)

'node' is a currently selected hierarchy node. This procedure is called when the user chooses to select the immediate children of 'node'. The procedure is:
1. Remove 'node' from the set of selected nodes.
2. Add node's children nodes onto the set of selected nodes.
3. Refresh plotted values by calling plot-values( ).

Drill-Down(List-of-Nodes)

'list-of-nodes' is a list of currently selected hierarchy nodes. This procedure is called when the user chooses to select the immediate children of each node in list-of-nodes. This is useful for efficiently drilling down from an entire hierarchy level. The algorithm for his procedure is:
1. Remove each node in list-of-nodes from the set of selected nodes.
2. Add each children node of each node in list-of-nodes onto the set of selected nodes.
3. Refresh plotted values by calling plot-values( ).

Drill-Up(Node)

'node' is the ancestor of some currently selected hierarchy node. This procedure is called when the user chooses to select 'node', consequently deselecting any of its descendent nodes. The algorithm is:

1. Traverse all nodes lower in node's hierarchy using known methods in computer science, removing them from the set of selected nodes.
2. Add node onto the set of selected nodes.
3. Refresh plotted values by calling plot-values( ).

Combine(Nodes-List, Newlabel)

This procedure is used to allow the user to modify an existing axis hierarchy to view value aggregations other than those displayable through the existing hierarchy. 'nodes-list' is a list of nodes in the same hierarchy, all having a common ancestor among the currently selected node subhierarchies. Let us call the common ancestor Anode. Anode is typically the direct parent of all members of nodes-list. This algorithm temporarily deletes all nodes in the hierarchy between Anode and nodes-list, making the nodes in nodes-list children of Anode. Anode may have other children nodes not in nodes-list; these are left untouched.

For example, see the previous discussion (FIG. 10) where the user created weekday and weekend aggregate nodes. There, Week was Anode and Days were the nodes in nodes-list. No nodes existed between Weeks and Days in the hierarchy. The user (via GUI commands in the Graph System) combined Monday, Tuesday, Wednesday, Thursday, and Friday nodes as the children of a new node whose label is "Weekdays". Weekdays became a child of the Week node. The user then combined Saturday and Sunday nodes as the children of the new node whose label is "Weekend". Weekend became another child of the Week node.

In place of the hierarchy with Week at the top and seven days at the bottom, the user received a three level hierarchy with Week at the top, Weekdays and Weekend underneath, Monday through Friday under Weekdays, and Saturday and Sunday under Weekend. Suppose (as shown in FIG. 10) the graph showed many weeks, rather than one week. The user (through convenient GUI commands) could execute these combine operations once over all weeks in the graph display.

The basic Combine algorithm is the following:
1. For all nodes between Anode and nodes-list, remove their links in the hierarchy, storing them in case the user wishes the hierarchy to be restored. If any were selected, unselect them and select the nodes in nodes-list.
2. Create a new node New and add it to Anode's children nodes of its currently selected subhierarchy. Set its label to newlabel. (In the weekday/weekend example, newlabel would be "weekdays" or "weekends".) Set its children nodes to nodes-list. Since there is only one subhierarchy, its selection-label field is irrelevant.
   Set New's Leaf?(node, selected-nodes) function to a function which ignores its arguments and returns False.
3. Set New's aggregation-function to Anode's aggregation-function.
4. Refresh plotted values by calling plot-values( ).

Uncombine(Nodes-List)

This procedure is used to undo the Combine operation previously done on nodes-list. The method is:
1. If the parent of nodes-list is a selected-node, unselect it and select the nodes in nodes-list.
2. Destroy the parent of nodes-list, which is referred to as 'New' in Combine step 4.
3. Restore the links removed in Combine step 1.
4. Refresh plotted values by calling plot-values( ).

Filter(Node, Replot?)

This procedure is called when the user wishes to filter 'node' out of the graph, as if it were not even in the Application. The algorithm is:

1. add node to a filtered-nodes set. Filtered-nodes is a global variable.
2. Let PARENT be node's parent node.
   If PARENT's currently selected subhierarchy's child-nodes are all in filtered-nodes,
      Filter(PARENT, False)
3. If replot? Is True, call plot-values( ).
   Step 2 recognizes that if all of a nodes children are filtered, the node itself is filtered. We go ahead and filter it to cut off other algorithms' tree traversals early. This is most important in plot-values, to keep a filtered subtree from being printed along its axis.

Unfilter(Node, Replot?)

This procedure is called when the user wishes to no longer filter out 'node'. The algorithm is:
1. If node is not in the filtered-nodes set, return.
2. remove node from filtered-nodes.
3. For each node CHILD in node's currently selected subhierarchy's child-nodes,
   Unfilter(CHILD, False)
4. If replot? Is True, call plot-value( ).

Step 2 makes it easy for a user to unfilter an entire subtree of nodes.

Cell Vectors and Cell Hierarchies

In the procedures described thus far, it will have been noted that various data types must match. Value-lookup's return value, aggregate-value's return value, and aggregate-value's arguments must all match type. Cells on the graph's grid have values of this type. In Initialize-Graph's step 5, Application 102 tells Graph System 100 how to format this value type. For instance, if the type is numeric, perhaps a bar with or without an accompanying printed number is the format. If the value is a vector of numbers, perhaps a row of bars positioned against each other is the format (as shown in FIG. 11).

Vectors fit into the current algorithms seamlessly. Aggregate-value just takes a list of vectors as argument and returns a vector containing aggregated numbers. For instance, if the argument list contained the two vectors <1, 3, 4> and <2, 4, 6>, the aggregate-value function should return the vector <3, 7, 10>. In FIG. 11, thus, Planned Sales, Allocated Sales, and Actual Sales are not hierarchy nodes at all. Instead, they label the cell vector values. North America, South America, Europe, and Asia are the leaf hierarchy nodes. The formatting of their labels along the Seller Hierarchy axis would include the printing of "Planned Sales", "Allocated Sales", and "Actual Sales."

Figure 18:
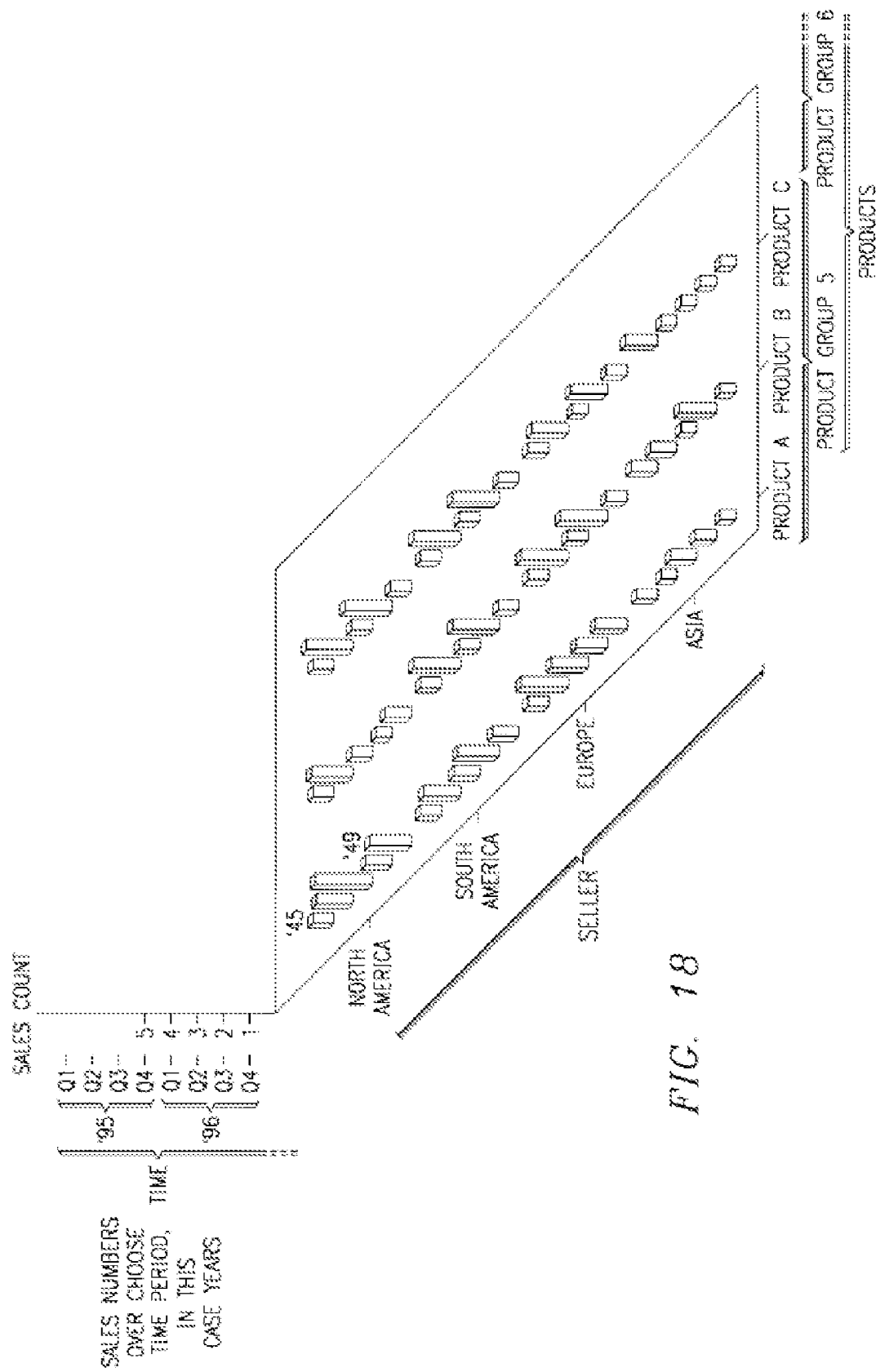
Figure 22:
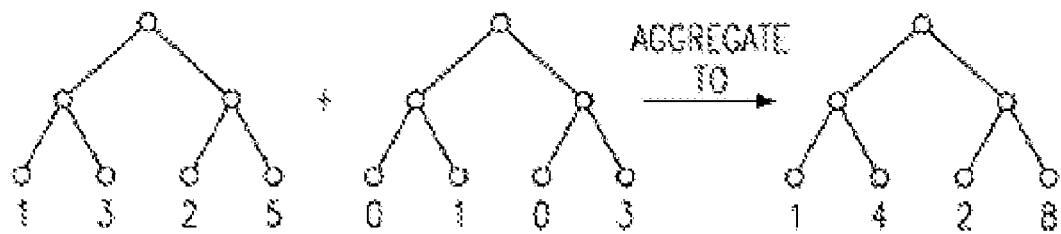
FIGS. 22 and 24 are hierarchy diagrams illustrating aspects of the preferred method.

The discussion relating to FIG. 18 presented the usefulness of the cell data type being a hierarchy (such as a tree of numbers). Such cell hierarchies allow the user to legibly plot functions of three hierarchies such as Seller, Product, and Time. With a cell hierarchy, the values returned by value-lookup and aggregate-values and the values plotted on each cell of the grid are all trees of numbers or other data. An example aggregation of two cell hierarchy values is shown in FIG. 22. In this example, the aggregation function is the summation of numbers in the trees. Why bother with a tree representation, when we could have used cell vectors to store <1, 3, 2, 5> and <0, 1, 0, 3> and defined their aggregate to be the vector <1, 4, 2, 8>? Because the cell hierarchy permits the user to traverse (via drilling up, drilling down, and filtering) and manipulate (via combine and uncombine) the cell hierarchy. (These algorithms on cell hierarchies are almost identical to those of the axis hierarchies.) Drilling up one level in the FIG. 22 cell hierarchy would change the cell displaying the values 1, 4, 2, and 8 to displaying 5, 10. (5 is the aggregation of 1 and 4; 10 is the aggregation of 2 and 8.) Drilling up another level leaves the cell displaying 15 (the aggregation of 1, 4, 2, and 8).

Initialize-graph's Step 5 is the step where Application 102 informs Graph System 100 about the cell hierarchy. It passes the structure of the hierarchy as a tree of hierarchy-node structures. This tree provides the tree structure and the labels of leaf and nonleaf nodes of the tree, which Graph System 100 needs to display its cell hierarchy in a legend. The user will click on this legend to issue commands such as drilling up and down the cell hierarchy, selecting alternate subhierarchies, combining, and filtering.

To handle cell hierarchy commands, Graph System 100 reuses slightly altered versions of most of the previously presented algorithms. For Drill-Down, Drill-Up, Combine, and Uncombine on cell hierarchies, the algorithms are all identical to those for axis hierarchies, except that the cell hierarchy versions modify a global set of cell hierarchy nodes, rather than a set of axis hierarchy nodes. The latter has been referred to as "selected nodes". For the remainder of this discussion, the former will be referred to as cell-hierarchy-selected-nodes. For example, the version of Drill-Down (node) for cell hierarchies is:
1. Remove 'node' from cell-hierarchy-selected-nodes, the set of selected cell hierarchy nodes.
2. Add node's children nodes onto cell-hierarchy-selected-nodes.
3. Refresh plotted values by calling plot-values( ).

The cell-hierarchy-selected-nodes specify how to format out all the trees of values at each point on the graph's grid. For instance, if the cell value is the 1-4-2-8 tree in FIG. 22 and the top node of the cell hierarchy is the only member of cell-hierarchy-selected-nodes, the format function should compute the aggregate of 1-4-2-8 (using aggregate-value) and print that value (15). If instead the two middle hierarchy nodes were selected, then it should print the values 5, 10.

The value formatting logic sent by Application 102 to Graph System 100 in initialize-graph step 5 must take the tree of values returned by aggregate-value and examine the cell hierarchy and cell-hierarchy-selected-nodes to see how to format out the tree on the graph's grid. The procedure is as follows:

Plot-Cell-Value(Hnode, Vnode)
{hnode is the top node in the cell hierarchy. Vnode is the top node of the tree of values we are plotting.}
  IF hnode is in cell-hierarchy-selected-nodes
  THEN
    Let L be an empty list.
    Traverse leafs of vnode, collecting their values in L.
    Plot the value returned by aggregate-value(L).
  ELSE
    FOR EACH child HC of hnode paired with the corresponding child VC of vnode,
      Plot-cell-value(HC, VC).

Vnode itself might be a leaf, in which case the traversal contains jus vnode.

Figure 23:
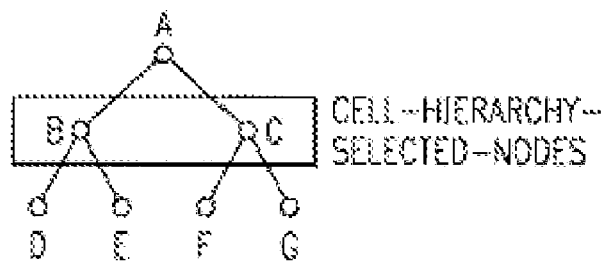

Since the algorithm of this procedure may be executed over many cells, speed optimizations are useful. The cell hierarchy could be traversed at the start, collecting the traversal paths and corresponding aggregate-value calls to make for all of the cell values to be formatted. Given the cell hierarchy in FIG. 23, we would traverse A, B, and C nodes only once. Then, for each cell value, we would know to get the leaf values in a first-order traversal and then call aggregate-value({first-leaf, second-leaf}) and aggregate-value({third-leaf, fourth-leaf}).

If cell value trees are stored via vectors, walking the leafs in first-order is extremely efficient.

Editing

Application 102 may be designed to operate similarly to a spreadsheet, with the user changing various values and seeing resultant changes to various computations in the GUI. In the case of the present invention, the user would have a way of editing values retrieved by value-lookup, and on each edit, Graph System would update the graph. For instance, if the graph were currently displaying a summation style aggregate of four values 10, 20, 40, 30, which is 100, and the user changed the first value from 10 to 20, the graph would change to display 110.

The simplest, non-integrated method to implement such editing in the present invention is for the user to change the underlying values feeding value-lookup via the Application's own editing tools, and then for the user or Application 102 itself to have Graph System 100 call plot-values.

The more convenient, integrated method is to click on a value plotted between axis hierarchy leaf nodes in Graph System 100 and type in a new value. Such functionality is enabled by Application 102 in Step 3 of the initialize-graph algorithm.

As described previously, the preferred method integrates well with the three dimensional graphing capabilities of products such as the floor/wall/wall graphing product available from i2 Technologies. This product uses a Floor/Wall/Wall (FWW) display system, to which the Graph System 100 has connections. The Floor pane of FWW holds Graph System's grid and hierarchy axes display. (Alternatively, one of the two walls could hold these things. Typically, the primary graph data is displayed on the floor, and the walls are used to show summaries.) Whenever Graph System 100 calls plot-values( ), it sends FWW the new Floor display and any updates to make on its walls.

The described system is usable with any data that can be expressed hierarchically. By ordering the data in this manner, and using the described procedures, a user can gain significant useful control over the display of data. As is well known, well displayed data can assist the user in understanding its implications, and the system and method of the present invention provides a significant step forward in the art.

While the invention has been particularly shown and described with reference to a preferred embodiment, it will be understood by those skilled in the art that various changes in form and detail may be made therein without departing from the spirit and scope of the invention.

What is claimed is:

1. A computer graphical user interface system comprising one or more computer-readable memory units, the system comprising:
  a database that stores hierarchically organized data of a multi-dimensional hierarchy of data;
  a multi-dimensional graphical user interface coupled with the database and providing user interaction of a multi-dimensional user interactive graph comprising:
    a multi-dimensional axes data hierarchy including a top layer hierarchy of a first axis dimension, a top layer hierarchy of a second axis dimension, and a top layer hierarchy of a third axis dimension;
    a unique bottom layer hierarchy including a plurality of function values of each of the top layer hierarchies of the multi-dimensional axes data hierarchy;
    a first wall graphical user interface grid of a mathematical summarization of the plurality of function values of each of the top layer hierarchies of the multi-dimensional axes data hierarchy, the first wall graphical user interface grid perpendicular with the first axis dimension; and a second wall graphical user interface grid of the mathematical summarization of the plurality of function values of each of the top layer hierarchies of the multi-dimensional axes data hierarchy, the second wall graphical user interface grid perpendicular with the second axis dimension; and a multi-dimensional value hierarchy of each of the function values of the multi-dimensional axes data hierarchy.

2. The computer graphical user interface system according to claim 1, wherein the multi-dimensional axes data hierarchy further comprises:

a plurality of levels of hierarchies of the top layer hierarchy, and the unique bottom layer hierarchy of each of the plurality of levels of hierarchies.

3. The computer graphical user interface system according to claim 2, wherein the user filters at least a portion of the plurality of levels of hierarchies and in response the filtered levels of hierarchies disappear from the multi-dimensional user interactive graph and the multi-dimensional graphical user interface displays the filtered levels of hierarchies in a separate filtered window.

4. The computer graphical user interface system according to claim 3, wherein the multi-dimensional graphical user interface allows for a user navigation of the multi-dimensional axes data hierarchy by drilling into the top layer hierarchies of each of the axis dimensions.

5. The computer graphical user interface system according to claim 1, wherein the multi-dimensional graphical user interface allows for each of the function values to be graphed over user selectable aggregations of user input data.

6. The computer graphical user interface system according to claim 5 wherein each of the function values are hierarchically arranged numbers and the user filters at least a portion of the multi-dimensional value hierarchies and in response the filtered value hierarchies disappear from the multi-dimensional user interactive graph and the multi-dimensional graphical user interface displays the filtered value hierarchies in a separate filtered legend window.

7. The computer graphical user interface system according to claim 6, wherein each of the function values of the multi-dimensional value hierarchy provide for user interaction of complex mathematical combinations of the multi-dimensional axes data hierarchy selected from the group consisting of: summation; average; minimum; and maximum.

8. A computer software product having a computer-readable memory with control logic stored therein that provides a computer graphical user interface, the control logic comprising:

a first computer readable program code that stores hierarchically organized data of a multi-dimensional hierarchy of data in a database and display the multi-dimensional hierarchy of data to a user;

a second computer readable program code that provides a multi-dimensional graphical user interface coupled with the database and providing user interaction of a multi-dimensional user interactive graph comprising:

a multi-dimensional axes data hierarchy including a top layer hierarchy of a first axis dimension, a top layer hierarchy of a second axis dimension, and a top layer hierarchy of a third axis dimension;

a unique bottom layer hierarchy including a plurality of function values of each of the top layer hierarchies of the multi-dimensional axes data hierarchy;

a first wall graphical user interface grid of a mathematical summarization of the plurality of function values of each of the top layer hierarchies of the multi-dimensional axes data hierarchy, the first wall graphical user interface grid perpendicular with the first axis dimension; and a second wall graphical user interface grid of the mathematical summarization of the plurality of function values of each of the top layer hierarchies of the multi-dimensional axes data hierarchy, the second wall graphical user interface grid perpendicular with the second axis dimension; and a multi-dimensional value hierarchy of each of the function values of the multi-dimensional axes data hierarchy.

9. The computer software product of claim 8, wherein the multi-dimensional axes data hierarchy further comprises:

a plurality of levels of hierarchies of the top layer hierarchy, and the unique bottom layer hierarchy of each of the plurality of levels of hierarchies.

10. The computer software product of claim 9, wherein the user filters at least a portion of the plurality of levels of hierarchies and in response the filtered levels of hierarchies disappear from the multi-dimensional user interactive graph and the multi-dimensional graphical user interface displays the filtered levels of hierarchies in a separate filtered window.

11. The computer software product of claim 10, wherein the multi-dimensional graphical user interface allows for a user navigation of the multi-dimensional axes data hierarchy by drilling into the top layer hierarchies of each of the axis dimensions.

12. The computer software product of claim 8, wherein the multi-dimensional graphical user interface allows for each of the function values to be graphed over user selectable aggregations of user input data.

13. The computer software product of claim 12, wherein each of the function values are hierarchically arranged numbers and the user is capable of filtering at least a portion of the multi-dimensional value hierarchies and in response the filtered value hierarchies disappear from the multi-dimensional user interactive graph and the multi-dimensional graphical user interface displays the filtered value hierarchies in a separate filtered legend window.

14. The computer software product of claim 13, wherein each of the function values of the multi-dimensional value hierarchy provide for user interaction of complex mathematical combinations of the multi-dimensional axes data hierarchy selected from the group consisting of: summation; average; minimum; and maximum.

15. A computer-implemented method for providing a computer graphical user interface, comprising:

storing by a computer hierarchically organized data of a multi-dimensional hierarchy of data in a database;

providing by the computer a multi-dimensional graphical user interface coupled with the database and providing user interaction of a multi-dimensional user interactive graph comprising:

a multi-dimensional axes data hierarchy including a top layer hierarchy of a first axis dimension, a top layer hierarchy of a second axis dimension, and a top layer hierarchy of a third axis dimension;

a unique bottom layer hierarchy including a plurality of function values of each of the top layer hierarchies of the multi-dimensional axes data hierarchy;

a first wall graphical user interface grid of a mathematical summarization of the plurality of function values of each of the top layer hierarchies of the multi-dimensional axes data hierarchy, the first wall graphical user interface grid perpendicular with the first axis dimension; and a second wall graphical user interface grid of the mathematical summarization of the plurality of function values of each of the top layer hierarchies of the multi-dimensional axes data hierarchy, the second wall graphical user interface grid perpendicular with the second axis dimension; and a multi-dimensional value hierarchy of each of the function values of the multi-dimensional axes data hierarchy.

16. The method of claim 15, wherein the multi-dimensional axes data hierarchy further comprises:

a plurality of levels of hierarchies of the top layer hierarchy and the unique bottom layer hierarchy of each of the plurality of levels of hierarchies.

17. The method of claim 16, further comprising:

filtering at least a portion of the plurality of levels of hierarchies and in response the filtered levels of hierarchies disappear from the multi-dimensional user interactive graph and the multi-dimensional graphical user interface displays the filtered levels of hierarchies in a separate filtered window; and navigating the multi-dimensional axes data hierarchy by drilling into the top layer hierarchies of each of the axis dimensions.

18. The method of claim 15, further comprising:

allowing each of the function values to be graphed over user selectable aggregations of user input data;

filtering at least a portion of the multi-dimensional value hierarchies and in response the filtered value hierarchies disappear from the multi-dimensional user interactive graph and the multi-dimensional graphical user interface displays the filtered value hierarchies in a separate filtered legend window; and providing for user interaction of complex mathematical combinations of the multi-dimensional axes data hierarchy.

* * * * *

UNITED STATES PATENT AND TRADEMARK OFFICE
CERTIFICATE OF CORRECTION

PATENT NO. : 7,639,256 B1  
APPLICATION NO. : 09/680603  
DATED : December 29, 2009  
INVENTOR(S) : Yablonski et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 741 days.

Signed and Sealed this

Ninth Day of November, 2010

David J. Kappos
*Director of the United States Patent and Trademark Office*